United States Patent
Dalaa et al.

(10) Patent No.: US 10,001,955 B2
(45) Date of Patent: *Jun. 19, 2018

(54) METHOD OF HANDLING A PRINT JOB SUBMITTED TO A CLOUD PRINTING SERVICE, AND ASSOCIATED USER CREDENTIALS, FOR PROCESSING BY AN AUTHENTICATED PRINTING SYSTEM AND SYSTEM FOR PERFORMING THE METHOD

(71) Applicant: NEXT PRINT TECHNOLOGIES APS, Nærum (DK)

(72) Inventors: Tavs Dalaa, Frederiksberg C (DK); Manfred Bergmann, Burgthann (DE)

(73) Assignee: Next Print Technologies APS, Naerum (DK)

( * ) Notice: Subject to any disclaimer, the term of this patent is extended or adjusted under 35 U.S.C. 154(b) by 51 days.

This patent is subject to a terminal disclaimer.

(21) Appl. No.: 15/031,486

(22) PCT Filed: Oct. 25, 2013

(86) PCT No.: PCT/IB2013/059672
§ 371 (c)(1),
(2) Date: Apr. 22, 2016

(87) PCT Pub. No.: WO2015/059524
PCT Pub. Date: Apr. 30, 2015

(65) Prior Publication Data
US 2016/0259601 A1    Sep. 8, 2016

(51) Int. Cl.
*G06F 3/12* (2006.01)
*G06F 21/60* (2013.01)

(52) U.S. Cl.
CPC .......... *G06F 3/1222* (2013.01); *G06F 3/1204* (2013.01); *G06F 3/1238* (2013.01);
(Continued)

(58) Field of Classification Search
CPC ....... G06F 21/608; G06F 3/1296; G06F 21/31
See application file for complete search history.

(56) References Cited

U.S. PATENT DOCUMENTS

| | | | |
|---|---|---|---|
| 2002/0114013 A1* | 8/2002 | Hyakutake | G06T 1/0021 358/3.28 |
| 2004/0230572 A1* | 11/2004 | Omoigui | G06F 17/30528 |

(Continued)

*Primary Examiner* — Ming Hon
(74) *Attorney, Agent, or Firm* — Birch, Stewart, Kolasch & Birch, LLP

(57) ABSTRACT

Due to different formats for print jobs, in particular different means of identifying users, it is a problem how to handle a print job submitted to a cloud printing service, in which a user is identified by first user credentials, for processing by an authenticated printing system for which the user is identified by second user credentials. This problem is solved by a method comprising the steps of: i. obtaining the print job from the cloud printing service, the print job comprising print job metadata comprising the first user credentials, ii. obtaining the second user credentials based on the first user credentials, iii. adding the second user credentials to the metadata, and iv. forwarding at least the print job metadata comprising the second user credentials, to the authenticated printing system for the processing. A system for performing the method is also provided.

20 Claims, 3 Drawing Sheets

(52) U.S. Cl.
CPC .......... *G06F 3/1247* (2013.01); *G06F 3/1268* (2013.01); *G06F 3/1273* (2013.01); *G06F 3/1287* (2013.01); *G06F 3/1288* (2013.01); *G06F 21/608* (2013.01)

(56) References Cited

U.S. PATENT DOCUMENTS

| | | | |
|---|---|---|---|
| 2006/0026232 A1* | 2/2006 | Malik | G06Q 10/107 709/204 |
| 2006/0274355 A1* | 12/2006 | Ferlitsch | G06F 21/608 358/1.15 |
| 2009/0009802 A1* | 1/2009 | Shaw | G06F 21/608 358/1.15 |
| 2010/0083133 A1* | 4/2010 | Takayama | G06Q 10/107 715/752 |
| 2010/0302579 A1* | 12/2010 | Nuggehalli | G06F 3/1203 358/1.15 |
| 2011/0145351 A1* | 6/2011 | Lee | G06F 3/1206 709/206 |
| 2011/0235085 A1 | 9/2011 | Jazayeri et al. | |
| 2013/0007450 A1* | 1/2013 | Janyavula | H04L 63/10 713/168 |
| 2013/0070288 A1* | 3/2013 | Muranaka | G06F 3/1204 358/1.15 |
| 2013/0235418 A1* | 9/2013 | Tanaka | H04N 1/00228 358/1.15 |
| 2013/0242334 A1* | 9/2013 | Ichida | G06F 3/1222 358/1.14 |
| 2013/0258384 A1* | 10/2013 | Kanoh | G06F 3/1297 358/1.13 |
| 2015/0339082 A1* | 11/2015 | Yeung | G06F 3/126 358/1.15 |

* cited by examiner

METHOD OF HANDLING A PRINT JOB SUBMITTED TO A CLOUD PRINTING SERVICE, AND ASSOCIATED USER CREDENTIALS, FOR PROCESSING BY AN AUTHENTICATED PRINTING SYSTEM AND SYSTEM FOR PERFORMING THE METHOD

TECHNICAL FIELD

The present invention concerns a method of handling a print job submitted to a cloud printing service for processing by an authenticated printing system. More particularly the present invention concerns a method of handling a print job submitted to a cloud printing service, in which a user is identified by first user credentials, for processing by an authenticated printing system for which the user is identified by second user credentials.

BACKGROUND ART

Generally printers used by higher education institutions and corporate organizations are connected to an internal or local network so that the printers may be shared between the users, i.e. the students and staff or workers.

In order to control access as well as to control or limit the costs associated with printing, document management or print accounting systems, collectively referred to as authenticated printing systems, are used for tracking and accounting for printing activity. Print activity tracking and accounting is typically based on a user's network username. For this to work, each print job should comprise the user's network username in the print job details. Accordingly when a user prints a document from his personal computer, PC, the print job generated from the document has the user's network username in the job details or print job metadata, e.g. in the header of the print job file, for use by the authenticated printing systems. When the user prints from a conventional PC, the network user name is readily available for incorporation in the print job details as the user typically logs on onto the PC, and onto the local network to which the PC is connected, using the network user name.

Driven by the desire to facilitate printing, in particular the desire to avoid needing to install printer driver software on each PC and the need for providing printing from mobile devices such as smart phones, mobile phones, tablet PCs, etc., so called "Cloud Printing" technologies, one example being Google Cloud Print™, have been devised. "Cloud" in "Cloud Printing" is related to the concept of Cloud Computing, which comprises network based services provided by virtual servers running and distributed on one or more real servers.

Thus a cloud printing service may receive print jobs from various types of clients, such as PCs, mobile phones, tablet computers, thin client PCs or packaged laptops such as a Chromebook™, i.e. a laptop running Chrome OS™. Further, a print job submitted to a cloud printing service may also originate in an entirely Web-based application such as the word processing and spreadsheet applications known as Google Docs™. Print jobs may also be submitted to the cloud printing service as documents of various file types, examples being Microsoft® word documents and Microsoft® Excel® documents etc., which generally are not easily acceptable by the printers themselves.

Once the cloud printing service has received the print job, it converts the print job into a language understandable by the printer and sends it to a cloud aware printer, i.e. a printer being connectable to the cloud printing service and capable of receiving the print job therefrom, for printing.

In this way printing is made more easy, as there is no need for printer drivers on the client (as conversion is made by the cloud printing service), and there is no need for printer servers (as each printer individually, being cloud aware, connects to the cloud printing service to retrieve print jobs for printing.)

Techniques for printing print jobs submitted to a cloud printing service are known from inter alia US2013083353A1, US2013100480A1, U.S. Pat. No. 8,531, 711B2, US2012188600A1, US2012206765A1, US2013135665A1, US2013114107A1 and US2013148145A1.

DISCLOSURE OF INVENTION

A cloud printing service may route a print job to a printer in the local network of a higher education institution or corporate organization. However, integrating the cloud printing service with authenticated printing systems used in the local network, poses a number of difficulties.

These difficulties are caused by inter alia the fact that the cloud printing service and the authenticated printing systems may use different formats for print jobs including different means of identifying users.

Firstly the user, when printing using a cloud printing service, may not be logged in to the local network, i.e. the network in which the authenticated printing system is placed, at all.

Secondly, many of the devices from which the user may submit print jobs to the cloud printing service do not create print jobs in the conventional sense, i.e. converting the document to be printed into a form printable by the printer and including print job details, as these devices, due to having limited computational resources, do not use printer drivers or cannot open the document. Indeed, this was one of the desires leading to the development of cloud printing services, that of allowing printing from devices such as a tablet PC or a Smartphone, which do not use conventional printer drivers.

Thus these difficulties include the difficulty to authenticate the user submitting the print job so as to prevent printing by unauthorized users, the difficulty to provide secure printing, i.e. printing the document only when the correct user is positioned at the printer, the difficulty to track and perform accounting of the print job so as to control or limit the allowable number of pages to print, and the difficulty to use the cloud printing service with a non-cloud aware printer.

It is therefore an object of the present invention to simplify and/or improve printing of a print job submitted to a cloud printing service on an authenticated printing system.

Accordingly, it is therefore an object of the present invention to provide a method of handling a print job submitted to a cloud printing service for processing by an authenticated printing system for preventing printing by unauthorized users.

It is a further object of the present invention to provide a method of handling a print job submitted to a cloud printing service for processing by an authenticated printing system for providing secure printing.

It is a further object of the present invention to provide a method of handling a print job submitted to a cloud printing service for processing by an authenticated printing system for tracking and performing accounting of print jobs.

It is yet a further object of the present invention to provide a method of handling a print job submitted to a cloud printing service for processing by an authenticated printing system for using non cloud aware printers with the cloud printing services.

It is also an object of the present invention to provide a system for performing the method for achieving at least one of the above mentioned objects.

It is additionally an object of the present invention to provide software configured for causing a computer on which the software runs to perform the method for achieving at least one of the above mentioned objects.

At least one of the above objects, or at least one of any of the further objects, which will be evident from the below description, is according to a first aspect of the present invention achieved by the method according to claim 1.

By adding the second user credentials to the metadata, the print job, as seen from the point of view of the authenticated printing system, comprises the required second user credentials and may be processed. The authenticated printing system may thus perform authorization of the user, secure printing of the print job, tracking of the print job, and/or accounting of the print job as if the print job originated from for example a conventional PC and having the second user credentials in the metadata from the start.

As seen from the above, the method according to the first aspect of the present invention simplifies and/or improves printing of a print job submitted to a cloud printing service on an authenticated printing system.

The steps are preferably performed from step i to iv.

The steps of the method may be performed by a processing server.

Handling may comprise printing, attempting to print and/or storing for later printing.

In the context of the present invention, "handling a print job submitted to a cloud printing service, in which a user is identified by first user credentials, for processing by an authenticated printing system for which the user is identified by second user credentials" is to be understood as encompassing "integrating a cloud printing service, in which a user is identified by first user credentials, with an authenticated printing system for which the user is identified by second user credentials".

The cloud printing service is preferably Google Cloud Print™, but it may alternatively be any of similar cloud print services in which print jobs are sent via a public cloud.

The user may be a student or staff at a higher education institution or a worker or employee of a corporate organization.

In the context of the present invention, the user is to be understood as encompassing the print job owner.

The print job may be submitted by the user from a user device such as a Smartphone, a tablet PC, a conventional PC, a thin client PC or a packaged laptop, such as a Chromebook™, as an email or as an attachment to an email, or alternatively via ftp or a web upload to a site hosted by the cloud printing service. The print job is typically submitted from the user device as a document such as a Microsoft® word document or a Microsoft® Excel® document; however the print job may also originate from a Web-based application such as the word processing and spreadsheet applications known as Google Docs™.

The first user credentials are used for authenticating the user to the cloud printing service and for associating a user account with the user, to which account the user may associate printers.

The first user credentials may comprise an email address, a username, a telephone number, an IP address or a code unique to the user. The first user credentials may further comprise a password associated with the email address, the username, the telephone number, the IP address or the code to prevent unauthorized access to the user's account at the cloud printing service.

The authenticated printing system may comprise an authentication server such as an LDAP server and/or a tracking and accounting server such as a server running Pcounter, Equitrac, PaperCut or other print tracking and accounting software.

The second user credentials may comprise a network user name, an email address, a telephone number, an IP address or a code unique to the user. The second user credentials may further comprise a password associated with the email address, the network username, the telephone number, the IP address or the code to prevent unauthorized access to the authenticated printing system.

Typically the first and second user credentials are different. This is due to the user often registering his account with the cloud printing service using first user credentials that he has chosen himself. The second user credentials, however, are most often set by the administrator of the authenticated printing system according to a scheme such as an abbreviation of the user's name possibly including the year of admittance in the case of an authenticated printing system of a higher education institution. In a corporate organization the second user credentials may instead include an indication of the department that the user is employed in.

It may happen that users have first and second credentials that are the same. For example a user may choose to use the same user name both for the cloud printing service and the authenticated printing system. Alternatively, the administrator of the authenticated printing system may create an account with the cloud printing service for every user that uses the authenticated printing system. In this case, there is however still the need for obtaining the print job from the cloud printing service. The second user credentials are still obtained based on the first user credentials, for example using a user credentials mapping database as described below, or using a rule specifying that the second user credentials are, or is a copy of, the first user credentials.

If the first and second user credentials are both email addresses, they are typically different, but they may be the same.

The second user credentials are used for authenticating the user to the authenticated printing service in order to identify the user to the authenticated printing service so that the authenticated printing service may process the print job.

Obtaining the print job may comprise receiving the print job as an email or as an attachment to an email from the cloud printing service, or downloading the print job using ftp.

In the context of the present invention, print job metadata is to be understood as encompassing print job details. The metadata may comprise the name or other identification information, including a network address, of the printer on which the print job is to be printed. In the context of the present invention, obtaining the second user credentials based on the first user credentials is to be understood as encompassing obtaining the second user credentials using the first user credentials.

In other words, there is a relationship between the first user credentials and the second user credentials such that the second user credentials may be obtained if the first user credentials are known. This may be achieved by a relational database, i.e. where the first user credentials are related to the second user credentials. Another possibility is that a function operating on the first user credentials generates the second user credentials. For example, if the first user credentials comprise an emails address such as user@company.com, the second user credentials may be generated by a function operating on the first user credentials by returning only the letters prior to the @sign, i.e. returning only "user". If, as discussed above, the first and user credentials are the same, then the function is a simple copy or equals function.

In the context of the present invention, adding the second user credentials to the metadata is to be understood as encompassing any of substituting the first user credentials with the second user credentials in the metadata, and adding the second user credentials to a field of the metadata different from the field comprising the first user credentials.

A field of the metadata is to be understood as encompassing part of the metadata.

In the context of the present invention, forwarding at least the print job metadata comprising the second user credentials to said authenticated printing system for said processing is to be understood as encompassing forwarding the print job, comprising the print job metadata comprising the second user credentials, to the authenticated printing system for the processing.

Generally it may be sufficient to forward only the metadata to the authenticated printing system for the processing, but preferably the print job, including the metadata, is forwarded to the authenticated printing system for the processing.

The embodiments according to claim 2 defines different ways of processing the print job by the authenticated printing system.

Authenticating may comprise comparing said second user credentials to a list of second user credentials associated with users allowed to print using the authenticated printing system.

Tracking may comprise listing the print job in a log.

Accounting the print job may comprise debiting the account associated with the user by for example subtracting the number of pages of the print job from a quota of printable pages, or subtracting the cost of printing the print job from a balance. Accounting the print job may alternatively, or additionally, comprise storing information about the print job for later presentation to the user.

Forwarding the print job may comprise forwarding the print job to a printer comprised by the authenticated printing system, or alternatively forwarding the print job to a printer connected to the authenticated printing system. In either case, the forwarding may be via a print server being part of the authenticated printing system, or alternatively be separate from the authenticated printing system.

The printer may be a laser printer or ink jet printer, a multifunctional printer (MFP), or a reprographic machine.

Claim 3 defines a preferred embodiment of the method according to the present invention. Converting the print job for making it printable by a printer may comprise converting the print job into pdf and/or rendering the print job.

Converting the print job may further comprise converting the format of the metadata of the print job for making the format of the metadata readable by the authenticated printing system.

Claim 4 defines a preferred embodiment of the method according to the present invention. The storage for pending print jobs may be a database or volume storing the print jobs. Polling the cloud print service may comprises querying the cloud printing service for pending print jobs to be printed on one or more specific printers, or polling the cloud print service for pending print jobs submitted to a cloud printing service account associated with the authenticated printing system or the operator of the authenticated printing system.

Polling may be performed by connecting to the storage for pending print jobs using Internet communication protocols such as HTTP, HTTPS, socket connections, POP, IMAP or similar.

Step x should be performed before step i, and step i should only be performed if it is determined in step x that the storage for pending print jobs comprises the print job.

Retrieving the print job may comprise downloading the print job or requesting the cloud print service to send the print job for receiving the print job.

Claim 5 defines a preferred embodiment of the method according to the present invention. In the context of the present invention, the user credentials mapping database is to be understood as encompassing a relational database or other database type storage.

The user credentials mapping database may be one or more tables in an SQL database. Querying the user credentials mapping database may comprise using the first user credentials in an SQL SELECT statement to retrieve the second user credentials related to the first user credentials.

Retrieving the second user credentials may comprise receiving the output of an SQL SELECT statement.

Obtaining the second user credentials from the user may comprise contacting the user using the first user credentials or information in the print job metadata.

Claim 6 defines a preferred embodiment of the method according to the present invention. If the first user credentials comprise an email address associated with the user, it becomes very easy to contact the user by sending the user an email to the email address. The obtaining of the second user credentials from the user may comprise receiving an email from the user comprising the second user credentials, or directing the user to a website for receiving the second user credentials.

In the context of the present invention, an email address associated with the user is to be understood as encompassing an email address accessible and usable by the user for at least receiving email.

Claim 7 defines a preferred embodiment of the method according to the present invention. If the second user credentials are to be obtained from the user, it is preferred that the second user credentials are stored in the user credentials mapping database mapped to the first user credentials, so that the next time the user submits a print job to the cloud print service to be handled for processing by the authenticated printing system the second user credentials will be present in the user credentials mapping database so that there is no need to obtain the second user credentials from the user this time.

It is contemplated within the context of the present invention that the obtaining of the second user credentials from the user may further comprise forwarding the second user credentials to the authenticated printing system for determining whether or not the user has an account registered with or in the authenticated printing system for authenticating, tracking and/or accounting, and if the user does not have an account with or in the authenticated printing system, create an account for the user with or in the authenticated printing system.

Claim 8 defines one embodiment of the method according to the present invention. The holding queue may be located in the authenticated printing system or in the processing server.

The release code may be an alphanumerical string. The release code may be generated by the authenticated printing system or it may be generated by the processing server.

Providing the release code to the user may comprise sending the release code in an email or, in a SMS or MMS, by direct messaging such as, or by publishing the release code on a website reachable by a unique URL sent to the user.

Receiving the release code may comprise receiving the release code in an email, SMS or MMS, or receiving the release code on a website hosted by the authenticated printing system or the processing server. The website may be displayed on a display of the printer or on a computer in the vicinity of the printer.

Releasing the print job from the holding queue may comprise forwarding the print job, comprising the print job metadata comprising the second user credentials, to the authenticated printing system for the processing.

Claim 9 defines a preferred embodiment of the method according to the present invention. Obtaining the registration information on the printer may comprise obtaining the registration information from the authenticated printing system and/or from the processing server.

The registration information may comprise the type of printer, the IP address of the printer, the printer network name, the capabilities of the printer, the status (online, offline, busy, ready, out of paper, paper jam, etc) of the printer.

In the context of the present invention, communicating the registration information to the cloud printing service for use by the user when submitting the print job to the cloud printing service is to be understood to also encompass communicating the registration information to the user for use by the user when adding registering the printer with the user's account with the cloud printing service.

In the context of the present invention, forwarding the print job to a printer is to be understood as encompassing forwarding the print job to a printer of a plurality of printers comprised by, or connected to, the authenticated printing system.

Claim 10 defines a preferred embodiment of the method according to the present invention. The first network is preferably the internet or a wide area network, and the second network is preferable a local network such as an office network, possibly including a virtual private network, VPN, of a corporate organization or campus wide network of a higher education institute such as a University.

Preferably, the second user credentials are used to gain access to the resources of the second network.

At least one of the above objects, or at least one of any of the further objects which will be evident from the below description, is according to a second aspect of the present invention achieved by the system according to claim 11.

The system according to the second aspect of the present invention is for performing the method according to the first aspect of the present invention. Thus the above described embodiments of features of the method according to the first aspect of the present invention are applicable to the system according to the second aspect of the present invention. Further embodiments of the system according to the second aspect of the present invention, and further embodiments of features of the system according to the second aspect of the present invention, are given below.

As the metadata modification program routine substitutes the first user credentials with the second user credentials in the metadata, the print job, as seen from the point of view of the authenticated printing system, is indistinguishable from a print job originating within the local network and the authenticated printing system may thus perform authorization of the user, secure printing of the print job, tracking of the print job, and/or accounting of the print job as if the print job originated within the local network from for example a conventional PC.

Further, the document retrieval program routine allows for using non cloud aware printers with the cloud printing service.

The processing server may be a separate server or may be integrated as part of another software. In particular the program routines of the processing server may be integrated with the commercially available mobile print software solution EveryonePrint, currently in version 3.3, developed by Next Print Solutions. The program routines of the processing server, and accordingly the processing server, may thus form part of the EveryonePrint software and run as part of the EveryonePrint software on a server.

In the context of the present invention, program routine is to be understood as encompassing program module. Further the program routine may comprise software or hardware.

Further, more than one server may run in separate virtual servers on a single physical server. In other words, an LDAP server and the tracking and accounting server may run on separate virtual servers running on a single physical server.

Furthermore the functions of different servers may be combined in a single server such that a single server may perform both authentication and tracking and accounting.

In the context of the present invention, connectable to cloud printing service and an authenticated printing system is to be understood as encompassing interposed between a cloud printing service and an authenticated printing system.

The document retrieval program routine may for example comprise an ftp program routine configured to retrieve the print job from an ftp server provided by the cloud printing service using ftp commands or a POP or IMAP program routine for retrieving the print job as an email from a mail server provided by the cloud printing service. Alternatively, the document retrieval program routine retrieves the print job by calling API interfaces supplied by the cloud printing service, via Internet protocols, such as HTTP or HTTPS.

The metadata modification program routine may alternatively be configured for substituting the first user credentials with the second user credentials in the same field of the metadata.

The processing server may alternatively be configured for forwarding the print job, comprising the metadata comprising the second user credentials, to the authenticated printing system for processing.

A preferred embodiment of the system according to the second aspect of the present invention is defined by claim 12. This is advantageous as it allows a larger variety of printers to be used with the cloud printing service.

A preferred embodiment of the system according to the second aspect of the present invention is defined by claim 13.

One or more of the authentication, print job tracking, accounting and print-server may be combined in a single server or software.

The system may comprise the authenticated printing system.

The print server may be part of the authenticated printing system, but it may also be separate from the authenticated printing system, however connected to the authenticated printing system.

A preferred embodiment of the system according to the second aspect of the present invention is defined by claim 14. This is advantageous as it makes it possible for the user to print on the authenticated printing system the first time. Further, by storing the first and second user credentials in the user credentials mapping database when handling the print job there is no need for obtaining the second user credentials from the user for subsequent print jobs. Preferably the first user credentials comprise an email address and the authentication program routine is configured to directly, or via a further program routine, contact the user by sending an email using for example the SMTP protocol to the email address.

The authentication program routine may further be configured for receiving an email with the second user credentials from the user, or for hosting a web site on which the user may input the second user credentials.

One embodiment of the system according to the second aspect of the present invention is defined in claim 15. This is advantageous as it provides for secure printing. As an alternative the authenticated printing system may be configured for holding the print job in a holding queue pending receipt of a release code, for providing the release code to the user, and for releasing the print job from the holding queue upon receiving the release code from the user.

A preferred embodiment of the system according to the second aspect of the present invention is defined by claim 16. This is advantageous as it also provides for using non-cloud aware printers with the cloud printing service.

A preferred embodiment of the system according to the second aspect of the present invention is defined by claim 17. This is advantageous as it further provides for using non-cloud aware printers with the cloud printing service.

At least one of the above objects, or at least one of any of the further objects which will be evident from the below description, is according to a third aspect of the present invention achieved by a computer program product according to claim 18.

The computer program product according to the third aspect of the present invention, when executed on a computer, causes the computer to perform the steps of the method according to the first aspect of the present invention.

The computer program according to the third aspect of the present invention may thus be used to provide the processing server of the system according to the second aspect of the present invention.

A computer usable medium may comprise a floppy disk, tape, a removable hard disk, a rewritable or non-rewritable CD or DVD, etc.

In the context of the present invention, a computer program product directly loadable into the memory of a computer is to be understood as encompassing a computer program product stored as a compressed or non-compressed file on a file server or computer or a computer program product loaded into the physical or virtual working memory, e.g. RAM, cache, or registry, of a computer. Thus, a computer program product downloadable from a server is considered to be encompassed by a computer program product directly loadable into the memory of a computer.

BRIEF DESCRIPTION OF DRAWINGS

The invention and its many advantages will be described in more detail below with reference to the accompanying schematic drawings, which for the purpose of illustration show some non-limiting embodiments, and in which.

DESCRIPTION OF EMBODIMENTS

Figure 1:
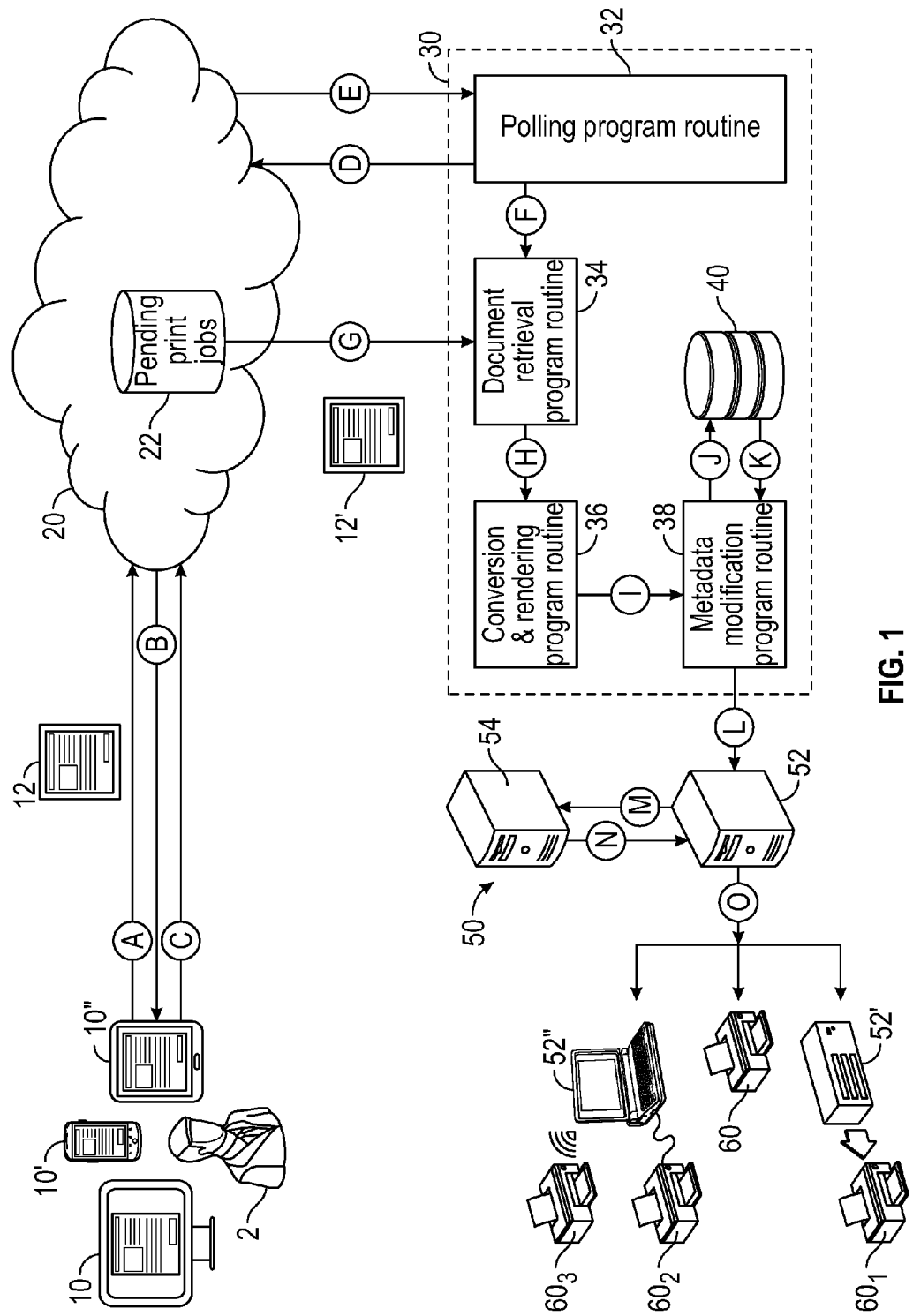
FIG. 1 shows a first embodiment of a method of handling a print job submitted to a cloud printing service for processing by an authenticated printing system and a system for performing the method according to the first and second aspects of the present invention.

In the below description, one or more signs added to a reference number indicates that the element referred to has the same or similar function as the element designated the un-superscripted reference number, however, differing in structure.

Further, where useful for discussing a plurality of identical elements, one or more subscript Latin numerals added to a reference number indicates that the element referred to is a further one of the elements designated the unsubscripted reference number.

When further embodiments of the invention are shown in the figures, the elements which are new in relation to earlier shown embodiments have new reference numbers, while elements previously shown are referenced as stated above. Elements which are identical in the different embodiments have been given the same reference numerals and no further explanations of these elements will be given.

FIG. 1 shows a first embodiment of a method of handling a print job submitted to a cloud printing service for processing by an authenticated printing system and a system for performing the method according to the first and second aspects of the present invention. A user 2 may use any of a desktop PC 10, a Smartphone 10' or a tablet PC 10", each representing a user device, to submit a print job represented by document 12. In step A the user 2 indicates his wish to print the document 12 using the cloud printing service 20. This may be done by selecting a print command provided by an application capable of opening the document 12, or may alternatively be done by sending document 12 using any of email, ftp, or web upload to the cloud printing service 20.

Together with the indication of the wish to print in step A, the user 2 submits first user credentials for identifying the user 2 to the cloud printing service 20. The first user credentials may for example be user 2's private email address and a password, a user name and a password, or the IP address of the user 2. Using the first user credentials, the cloud printing service 20 retrieves a list of printers previously assigned to the first user credentials. The list of printers may for example have been created by the user 2 by logging into his account on the cloud printing service 20 and selecting any of the printers owned by user 2 or any of publicly available printers operated by a corporate organization or a higher education institution.

Figure 2:
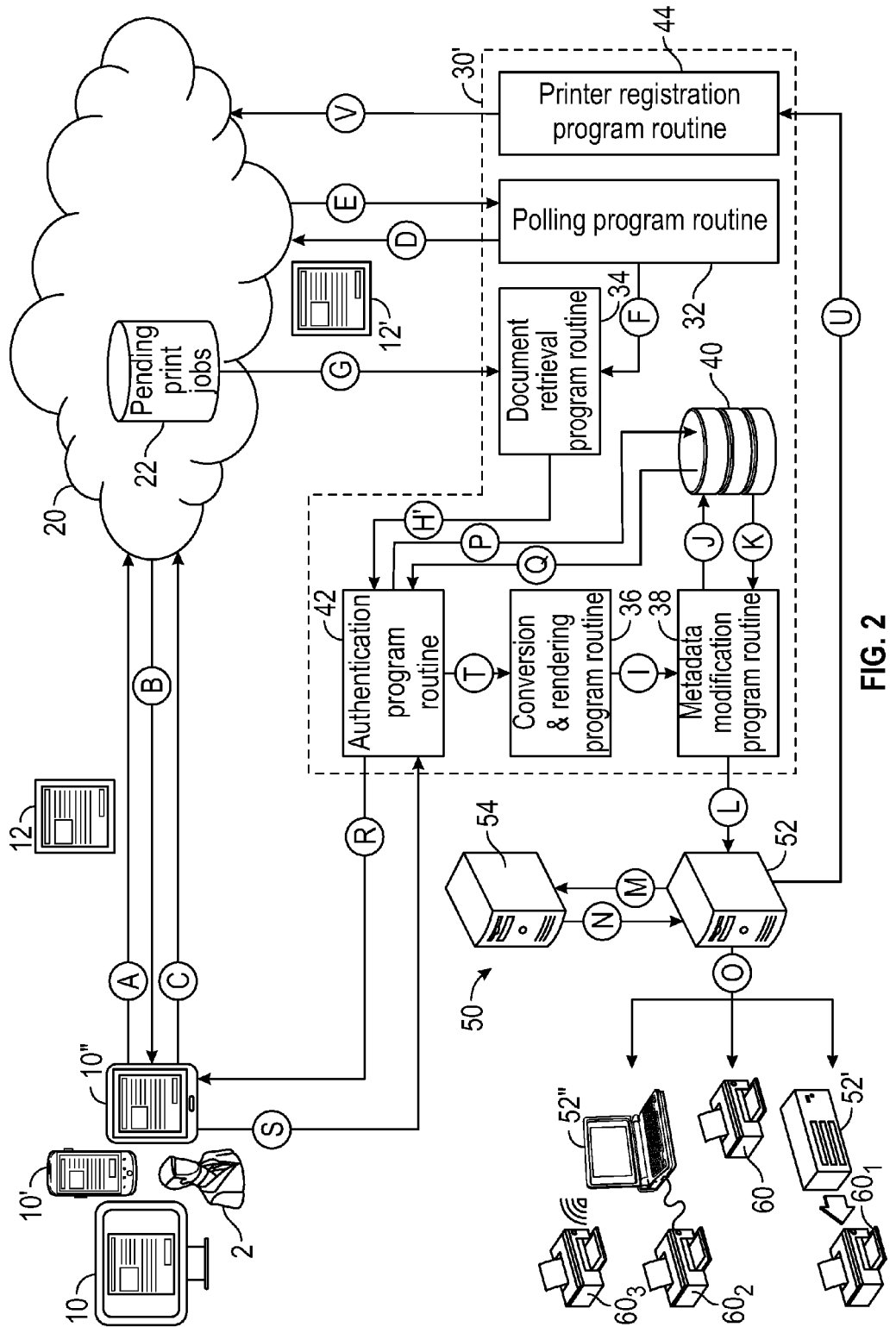
FIG. 2 shows a second embodiment of the method of handling a print job submitted to a cloud printing service for processing by an authenticated printing system and the system for performing the method according to the first and second aspects of the present invention.

In FIGS. 1 and 2 the user 2 wishes to print the print job to a printer operated by a higher education institution called "Acme University" which wishes to make its printers publicly available using an account, for example acmeuniversityprint@cloudprintingservice.com at the cloud printing service as described below with reference to FIG. 2.

Using the first user credentials, the cloud printing service 20 may further authenticate the user 2 to determine if the user 2 has access to the cloud printing service.

The cloud printing service in step B communicates the list of previously assigned printers to for example the desktop PC 10 and prompts the user 2 to select a printer to use for printing the document 12. Alternatively, the selection of the printer to use may be included with the indication of the wish to print the document 12.

In step C the user 2 selects a printer to use whereupon the selection of the printer to use together with the document 12 is communicated by any of email, ftp or web upload to the cloud printing service 20. The cloud printing service 20, upon receiving the document 12, may, dependent on the format of the document 12, perform conversion of the document 12 into pdf or similar portable format. The document 12, in non-converted or converted form, is then stored in a pending print jobs storage 22 awaiting further processing. As an alternative to steps B and C, a modified step A may include communicating both the selection of the printer and the document together with the indication of the user's wish to print.

The document 12 may be stored locally on the desktop PC, a Smartphone or tablet PC 10, 10' or 10", or the document may be stored in a cloud storage system (not shown) and retrieved from the cloud storage system by the cloud printing service 20 using the first user credentials or other user credentials supplied by the user 2 using the desktop PC, Smartphone or tablet PC 10, 10' or 10".

The system for performing the method of handling the print job 12 submitted to the cloud printing service 20 for processing by the authenticated printing system of "Acme University" includes a processing server 30 operated by "Acme University". The processing server 30 is interposed in the path of the document 12 between the cloud printing service 20 and the authenticated printing system 50 of "Acme University" and the printer 60 operated by "Acme University". The processing server 30 comprises a polling program subroutine or module 32 for continuously polling the cloud printing service 20 for any pending print jobs stored in the pending print jobs storage 22 as indicated by step E using the list of previously assigned printers in order to detect whether the pending print jobs storage 22 comprises any print jobs to be printed to any printer on this list. In this case there is a print job, i.e. document 12, which is stored in the pending print jobs storage 22.

The information about the existence of document 12 is sent from the cloud printing service 20 to the polling program routine or module 32 in step D.

Upon receiving information in step D regarding the existence of the document 12, the polling program routine prompts the document retrieval program routine 34 to contact the cloud print service 20, in particular the pending print jobs storage 22, in order to download the document 12', interchangeably called the print job 12', for printing as shown in step G. The document 12' may be the same as document 12, or alternatively it may have already been converted into a format more suitable for printing. In any case, the document 12' comprises metadata, which metadata include the first user credentials.

Once the document 12' has been retrieved by the document retrieval program routine 34, it is in step H sent to a conversion & rendering program routine 36 which, dependent on the format of the document 12' and the types of formats supported by the printers, may convert it further for making the document 12' printable by the printers. The conversion & rendering program routine may also, dependent on the formats supported by the printer 60, render the document 12' for printing.

The converted print job comprising document 12' is now in step I sent to a metadata modification program routine 38 in which the entry in the metadata referring to the first user credentials are exchanged for second user credentials. For this purpose, the processing server 30 comprises, or has access to, a user credentials mapping database 40, which in step J is queried using the first user credentials, and which in step K provides the matching second user credentials. The metadata modification program routine 38 now supplants the first user credentials with the second user credential in the metadata of the print job comprising the document 12'.

The print job comprising the documents 12' is then sent, in step L, to an authenticated printing system 50 which comprises a print server 52 and an authentication, tracking and accounting server 54. The print job is first analyzed by the print server 52 to determine the destination, i.e. which printer is to print the print job. Additionally, the print job metadata are supplied to the authentication, tracking and accounting server 54 in step M. The authentication, tracking and accounting server 54 comprises a database of a plurality of second user credentials, one of the plurality of second user credentials corresponding to the second user credentials comprised by the print job metadata for authenticating the user 2 as being allowed to use the printers connected to the authenticated printing system 50. Further the authentication, tracking and accounting server 54 may comprise an active print job database comprising details of every print job currently printing on the printers or temporarily stored by the print server 52 in order to track the progress of each print job. The authentication, tracking and accounting server 54 also comprises a database of user accounts, each user account being associated with one of the plurality of second user credentials, comprising setting or quotas for controlling and restricting printing on a per user basis. The settings may for example comprise settings or rules for limiting which printers are available to each user, including the user 2, and the quotas may comprise a maximum number of pages printable per user, including user 2, and month or year. Further the rules may include rules which disallow the user from printing any colour print jobs, only allowing the user to print in black/white.

After the authentication, tracking and accounting server 54 has determined that the user 2 is allowed to print the print job, e.g. due to the printer selected in step C being one of the printers that the user 2 is allowed to print to and/or the quota corresponding to the user 2 is not yet met and will not be exceeded by printing the print job, then the authentication, tracking and accounting server 54 communicates this to the print server 52 in step N, following which the print server 52 sends the print job to the printer 60 in step O for printing. The printer 60 then directly, or after temporarily storing the print job in the memory of printer 60, prints the print job.

Thus, as can be seen in FIG. 1, the first embodiment of the method and system according to the first and second aspects of the present invention allows the user 2 to print the document 12 on the printer 60 connected to the authenticated printing system 50 using the cloud printing service 20 despite having first user credentials for identifying the user 2 to the cloud printing service and second user credentials for use with the authenticated printing system 50. This allows an integration of the cloud printing service 20 with the authenticated printing system 50 and affords the user 2 the advantage of being able to easily, and from any location where it is possible to communicate with the cloud printing service 20, print the document 12 while at the same time affording an administrator of the authenticated printing system 50 and/or operator of the printer 60 the possibility of controlling and limiting usage, i.e. printing on the printer 60 as afforded by a conventional printing system, i.e. one which requires the user 2 to submit the document 12 directly to the print server 52 and in which the user 2 uses single user credentials, i.e. the second user credentials.

Further the polling program routine 32 and the document retrieval program routine, by performing polling for new print jobs and retrieval of print jobs, allow conventional, in this context, non-cloud aware printers to be used.

As an alternative to the printer 60, the print job may in step O be sent to the printer 60₁ via a secondary print server 52'. In a further alternative, the print job is sent in step O to wired printer 60₂ or wireless printer 60₃, any of which may be connected to a secondary print server embodied by laptop computer 52" comprising wired and wireless interfaces for communication with the respective printers 60₂ and 60₃.

If the user 2 desires to use printing with secure release, i.e. printing where the print job is put in a holding queue and is not printed until requested by the user 2, while being present at the location of the printer 60, then the print server 52 may hold the print job in the holding queue until a release code or the password associated with the second user credentials is input by the user 2 on the printer 60 or on a web-site hosted by the print server 52.

If the first user credentials comprise the email address of user 2, then the release code may be sent to this email address.

If in the first embodiment of the method and system according to the first and second aspects of the present invention shown in FIG. 1 the user credentials mapping database 40 contains no second user credentials associated with the first user credentials, then the handling of the print job may be aborted by the metadata modification program routing after step K when no second user credentials or data indicating the lack of second user credentials for the first user credentials is returned to the metadata modification program routine in step K. Alternatively, the metadata modification program routine may still forward the print job to the print server 52, however with the first user credentials comprised in the metadata of the print job. In this case, the print job may still be printed if the authentication, tracking and accounting server 54 is set up to allow printing by unrecognized users, however, typically the print job will not be printed as the authentication, tracking and accounting server 54 cannot authenticate the user 2.

This is a problem the first time the user 2 wishes to print on the printer 60 connected to the authenticated printing system 50 using the cloud printing service 20. One solution is that the user 2 contacts the operator or administrator of the processing server 30 and informs the operator or administrator of the second user credentials corresponding to the first user credentials and requests the operator or administrator to update the user credentials mapping database 40. However, this increases the workload for the operator or administrator.

The second embodiment of the method and system according to the first and second aspects of the present invention provides a solution to this problem as will be described below in relation to FIG. 2.

FIG. 2 shows a second embodiment of the method of handling the print job 12 submitted to the cloud printing service 20 for processing by the authenticated printing system 50 of "Acme University" according to the first and second aspects of the present invention. The second embodiments are similar to the first embodiments with the difference that a modified processing server 30' now comprises an authentication program routine 42 to which the document 12' is sent in a modified step H'. The authentication program routine 42 extracts the first user credentials from the metadata of the print job 12' and queries the user credentials mapping database 40 in step P using the first user credentials to get a response therefrom, as indicated by step Q, indicating whether or not the first user credentials are found in the user credentials mapping database 40 and if so, the second user credentials associated with the first user credentials.

If the first user credentials and the second user credentials are found in the user credentials mapping database, the authentication program routine sends the print job to the conversion & rendering program routine in step T, and processing commences as described with relation to FIG. 1 above.

If however the first user credentials are not found in the user credentials mapping database 40, or if there are no second user credentials associated with the first user credentials, then the authentication program routine itself, or using a communication program routine (not shown) comprised by the processing server 30', contacts the user 2 in step R. In this regard is it preferred that the first user credentials comprises an email address, as an email address may be very easily used, by sending an email, for contacting the user 2. The user 2 is thus presented with the information that he has submitted a print job to a printer connected to the authenticated printing system 50, but that the authenticated printing system 50 cannot recognize his (first) user credentials. The user 2 is thus prompted to supply his second user credentials corresponding to the first user credentials, by for example an email to the authentication program routine or the communication program routine (not shown), or by entering the information on a web page hosted by the authentication program routine or the communication program routine (not shown) as indicated by step S.

Once the authentication program routine 42 has received the second user credentials in step S, it causes the mapping of the first user credentials to the second user credential in the user credentials mapping database 40 in steps similar to the steps P and Q.

The authentication program routine 42 then submits the print job to the conversion & rendering program routine in step T, and processing commences as described with relation to FIG. 1 above, using the second user credentials supplied by the user in step S for the metadata modification performed by the metadata modification program routine 38.

If the second user credentials supplied by the user 2 in step S are not found in the database of second user credentials in the authentication, tracking and accounting server 54, by for example being incorrect or representing an attempt to gain unauthorized access to the printer 60, then as described above, the authenticated printing system 50 may, or may not, print the print job.

Although the authentication program routine 42 and the metadata modification program routine 38 are shown as separate program routines or modules of the processing server 30', the functions of these program routines may be combined in a single program routine. In any case, it is preferred that authentication of the user 2, i.e. the functions of the authentication program routine, is performed prior to executing the conversion & rendering program routine in order to conserve computational resources by avoiding converting and rendering print jobs from unauthorised users.

Thus, where the authentication program routine 42 and the metadata modification program routine 38 are combined into a combined program routine, this combined program routine should preferably be performed before the execution of the conversion & rendering program routine 36.

The processing server 30' shown in FIG. 2 further comprises a printer registration program routine 44 which continuously receives information of the printers 60, $60_1$, $60_2$ and $60_3$ from the print server 52 or a printer directory (not shown) internal to the processing server 30' as shown by step U, and sends this information to the cloud printing service 20 in step V for registering the printers 60, $60_1$, $60_2$ and $60_3$ to a cloud printing service account such as acmeuniversityprint@cloudprintingservice.com. Taking the cloud printing service Google Cloud Print™ as an example, this is done by registering a Google Cloud Print™ account, in this case acmeuniversityprint@gmail.com. In order for the processing server 30' to interact with Google Cloud Print™, an authorized API access is created with Google apis. The authorized API access uses an Oauth 2.0 standard for allowing the processing server 30' to retrieve the print job 12' from the cloud printing service 20 without the user 2's private information being exposed to the processing server 30'. The printers 60, $60_1$, $60_2$ and $60_3$ are then registered to the Google Cloud Print™ account acmeuniversityprint@gmail.com.

The printers 60, $60_1$, $60_2$ and $60_3$ are then registered as being publicly available by creating public links to the printers 60, $60_1$, $60_2$ and $60_3$ enabling anyone with a public link to send print jobs to the printers. This public link may be searchable on the cloud printing service by user 2, by searching for the name of the corporate organization or higher education institution at which the user wishes to print, or alternatively the processing server 30' may host a web site listing the publicly available printers 60, $60_1$, $60_2$ and $60_3$. In any case, the user 2 selects the printer he wants to add to his account with the cloud printing service, i.e. the account having the first user credentials, and is thus able to submit print jobs to this publicly available printer.

Figure 3:
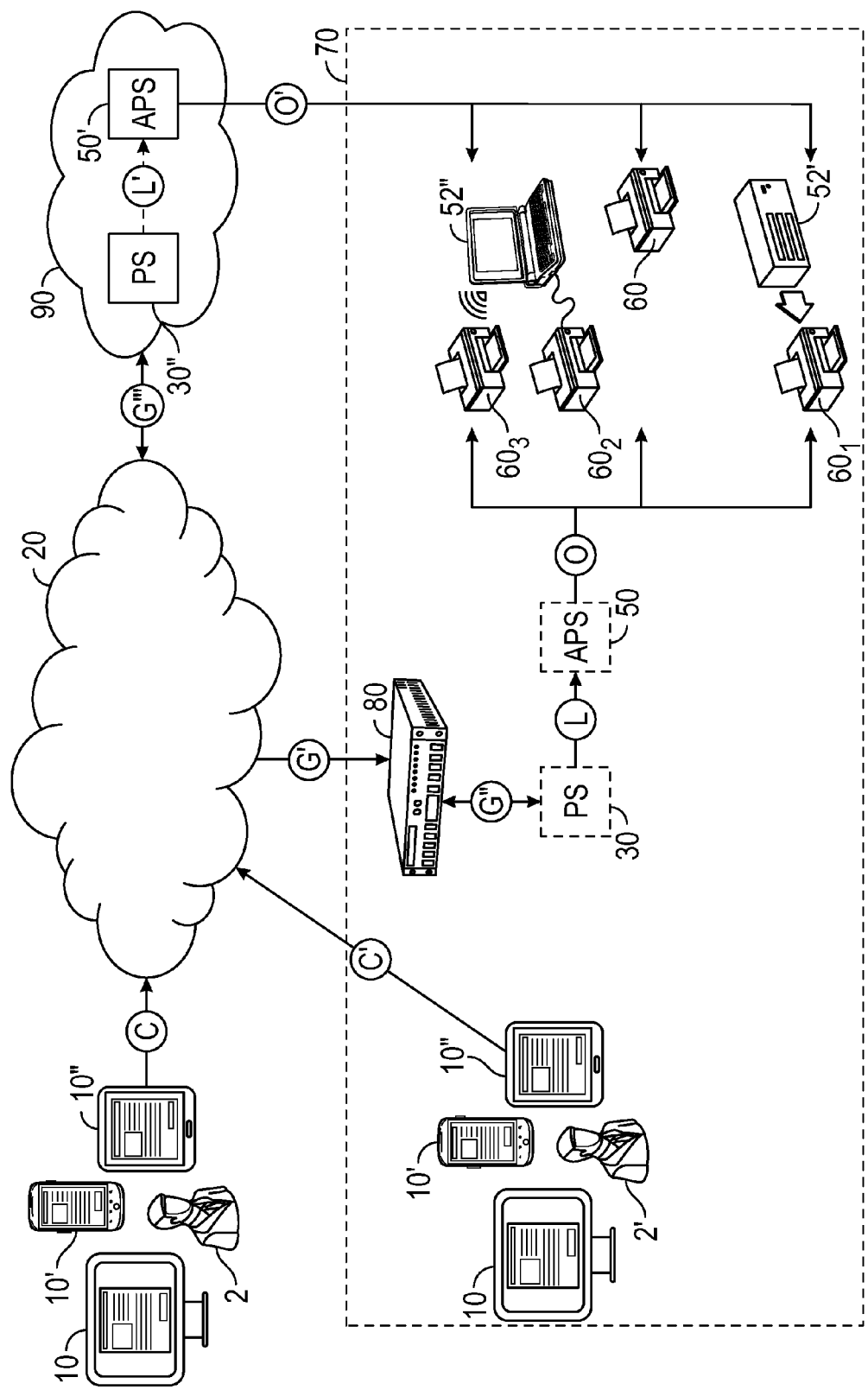
FIG. 3 shows further embodiments of the method of handling a print job submitted to a cloud printing service for processing by an authenticated printing system and the system for performing the method according to the first and second aspects of the present invention.

FIG. 3 shows further embodiments of the method of handling a print job submitted to a cloud printing service for processing by an authenticated printing system and the system for performing the method according to the first and second aspects of the present invention. These further embodiments comprise variants in placing the processing server 30 and the authenticated printing system 50 in relation to the cloud printing service 20 and the printing location 70. The printing location 70 is the location of the printers of the corporate organization or higher education institution and may also be defined by the internal network of the corporate organization or higher education institution, the internal network being segregated from an external network, i.e. the internet, in which the cloud printing service is located, by a firewall indicated by the dashed line defining the printer location 70.

Firstly, as is shown in FIG. 3, the user 2 may be located outside the printer location 70. This may be the situation when the user 2 wishes to print on the printer 60 when travelling to or from the printing location 70. This situation corresponds to that shown in FIGS. 1 and 2, however only step C is indicated in FIG. 3.

Secondly a user 2', who is similar to user 2, the difference being the location of the user 2', may print to printer 60 while being present within or at the printing location 70. For example the user 2' may use the internal network of the corporate organization or higher education institution to submit his print job, as indicated by modified step C', to the cloud printing service 20.

In the normal situation, corresponding to that of FIGS. 1 and 2, the processing server 30 and the authenticated printing system 50 are located within the printing location 70. In this case the processing server 30 and the authenticated printing system 50 are operated by the corporate organization or higher education institution or on their behalf. In this case, depending on the strictness of the firewall, i.e. what types of connections the firewall allows, a gateway 80 may be provided for permitting access between the cloud printing service 20 and the processing server 30 as indicated by modified steps G' and G".

This normal situation may be desired for corporate organization or higher education institution which already uses an authenticated printing system. It also affords the corporate organization or higher education institution full control over the printing.

In an alternative situation, a processing server 30" and an authenticated printing system 50', both being modified to be provided as cloud services in a print management cloud 90, are placed outside the printer location 70, i.e. outside the internal network of the corporate organization or higher education institution. In this case the processing server 30" obtains the print job from the cloud printing service 20 in modified step G''', processes it as described previously with reference to FIGS. 1 and 2, and then submits it in modified step L' to the authenticated printing system 50', which then in modified step O' sends the print job for printing on any of the printer 60, $60_1$, $60_2$ or $60_3$.

This alternative solution is advantageous for corporate organizations or higher education institutions which do not wish to run and maintain the processing server 30 and the authenticated printing system 50 directly.

LIST OF PARTS WITH REFERENCE TO THE FIGURES

2. User
10. User device
12. Document
20. Cloud printing service
22. Pending print jobs storage
30. Processing server
32. Polling program routine
34. Document retrieval program routine
36. Conversion & rendering program routine
38. Metadata modification program routine
40. User credentials mapping database
42. Authentication program routine
50. Authenticated printing system
52. Print server
54. Authentication, tracking and accounting server
60. Printer
70. Printing location
80. Gateway
90. Print management cloud

The invention claimed is:

1. A method of handling a print job submitted to a cloud printing service, in which a user is identified by first user credentials, for processing by an authenticated printing system for which said user is identified by second user credentials, comprising the steps of:
obtaining said print job from said cloud printing service, said print job comprising print job metadata comprising said first user credentials, obtaining said second user credentials based on said first user credentials, adding said second user credentials to said metadata, wherein adding the second user credentials to the metadata comprises substituting the first user credentials with the second user credentials in the metadata, and forwarding at least said print job metadata, comprising said second user credentials, to said authenticated printing system for said processing, wherein the steps of the method are performed by a processing server serving as an intermediary between said cloud printing service and said authenticated printing system.

2. The method according to claim 1, said processing by said authenticated printing system comprising one or more of the steps:

authenticating said user using said second user credentials, tracking said print job using said second user credentials, accounting said print job, using said second user credentials, to an account associated with said user, or forwarding said print job to a printer for printing.

3. The method according to claim 1, further comprising the step of:

converting said print job for making it printable, by a primer.

4. The method according to claim 1, said cloud printing service comprising a storage for pending print jobs and the method further comprising the step of:

polling said cloud printing service for determining whether said print job is stored in said storage for pending print jobs, and if so, retrieving said print job from said cloud print server.

5. The method according to claim 1, said obtaining of said second user credentials comprising:

querying a user credentials mapping database using said first user credentials, and if said first user credentials are found in the user credentials mapping database and are mapped to said second user credentials in said user credentials mapping database, retrieving said second user credentials, or alternatively, querying a user credentials mapping database using said first user credentials, and if said first user credentials are not found in the user credentials mapping database, or if said second user credentials are not found in said user credentials mapping database or mapped to said first user credentials, obtaining said second user credentials from said user.

6. The method according to claim 5, said first user credentials comprising an email address associated with said user and said obtaining of said second user credentials from said user comprising contacting said user using said email address.

7. The method according to claim 5, said obtaining of said second user credentials from said user comprising storing said second user credentials in said user credentials mapping database, and mapping said second user credentials to said first user credentials in said user credentials mapping database.

8. The method according to claim 1, further comprising the steps of holding said print job in a holding queue pending receipt of a release code, providing said release code to said user, and receiving said release code from said user and releasing said print job from said holding queue.

9. The method according to claim 1, said processing by said authenticated printing system comprising forwarding said print job to a printer, the method further comprising the steps of obtaining registration information on said printer, and communicating said registration information to said cloud printing service for use by said user when submitting said print job to said cloud printing service.

10. The method according to claim 1, said cloud printing service being provided on a first network, such as the internet, and said authenticated printing system being provided on a second network, such a network associated with a corporate organization or a higher education institution.

11. A system for performing the method according to claim 1, comprising a processing server connectable to a cloud printing service and an authenticated printing system, said processing server comprising:

a document retrieval program routine for retrieving said print job from said cloud printing service, said print job comprising print job metadata comprising said first user credentials, a user credentials mapping database for providing said second user credentials based on said first user credentials, and a metadata modification program routine for obtaining said second user credentials based on said first user credentials from said user credentials mapping database and adding said second user credentials to said metadata, said processing server further being configured to forward at least said print job metadata comprising said second user credentials, to said authenticated printing system for said processing.

12. The system according to claim 11, said processing server further comprising:

a conversion program routine for converting said print job for making it printable by a printer.

13. The system according to claim 11, said authenticated printing system comprising one or more of:

an authentication server for authenticating said user using said second user credentials, a print job tracking server for tracking said print job using said second user credentials, or an accounting server for accounting said print job, using said second user credentials, to an account associated with said user, and possibly also a print server for forwarding said print job to a printer for printing.

14. The system according to claim 11, said processing server further comprising:

an authentication program routine for determining if first user credentials are found in said user credentials mapping database, and if so whether said second user credentials are found in the database, said authentication program routine further being configured to contact said user if said first user credentials or said second user credentials are not found in the user credentials mapping database, for obtaining said second user credentials from said user, and to store said first and second user credentials in said user credentials mapping database and mapping said second user credentials to said first user credentials in said user credentials mapping database.

15. The system according to claim 11, said processing server further being configured for holding said print job in a holding queue pending receipt of a release code, for providing said release code to said user, and for releasing said print job from said holding queue upon receiving said release code from said user.

16. The method according to claim 11, said system further comprising a printer connected to said authenticated printing system, or alternatively said authenticated printing system comprising a printer, said processing server further comprising a printer registration program routine for obtaining registration information on said printer and for communicating said registration information to said cloud printing service for use by said user when submitting said print job to said cloud printing service.

17. The system according to claim 11, said processing server further comprising:
   a polling program routine for polling said cloud printing service for determining whether said print job is stored in said storage for pending print jobs, said polling program routine further being configured for causing said document retrieval program routine to retrieve said print job if said polling program routine determines that said print job is stored in said storage for pending print jobs.

18. A computer program, stored on a non-transitory computer readable medium, which, when executed on a computer, causes said computer to perform the steps of the method according to claim 1.

19. The method according to claim 2, further comprising the step of:
   converting said print job for making it printable by a printer.

20. The method according to claim 2, said cloud printing service comprising a storage for pending print jobs and the method further comprising the step of:
   polling said cloud printing service for determining whether said print job is stored in said storage for pending print jobs, and if so, retrieving said print job from said cloud print server.

* * * * *